United States Patent
Gritton et al.

(10) Patent No.: US 8,596,076 B1
(45) Date of Patent: Dec. 3, 2013

(54) VARIABLE PRESSURE RATIO GAS TURBINE ENGINE

(75) Inventors: Mark Gritton, Indianapolis, IN (US); Matthew J. Starr, Indianapolis, IN (US); Theodore J. Fritsch, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 921 days.

(21) Appl. No.: 12/649,636

(22) Filed: Dec. 30, 2009

Related U.S. Application Data (60) Provisional application No. 61/203,863, filed on Dec. 30, 2008.

(51) Int. Cl.
*F02C 3/13* (2006.01)

(52) U.S. Cl.
USPC ........... 60/792; 60/39.163; 415/145; 415/160

(58) Field of Classification Search
USPC ............. 60/762, 262, 39.22–39.25, 794, 785, 60/792, 39.163, 805, 226.3; 415/144–145, 415/149.2–149.4, 159–162
See application file for complete search history.

(56) References Cited

U.S. PATENT DOCUMENTS

| | | | | |
|---|---|---|---|---|
| 2,755,621 A | * | 7/1956 | Terrell | 60/792 |
| 3,016,698 A | * | 1/1962 | Sobey | 60/761 |
| 3,368,352 A | * | 2/1968 | Colin | 60/224 |
| 3,585,795 A | * | 6/1971 | Grieb | 60/39.163 |
| 4,294,068 A | | 10/1981 | Klees | |
| 4,655,248 A | * | 4/1987 | Chalaire | 137/528 |
| 5,311,736 A | | 5/1994 | Lardellier | |
| 5,694,768 A | | 12/1997 | Johnson et al. | |
| 6,701,717 B2 | | 3/2004 | Flatman et al. | |
| 6,901,739 B2 | | 6/2005 | Christopherson | |
| 7,140,174 B2 | | 11/2006 | Johnson | |
| 2005/0072158 A1 | | 4/2005 | Christopherson | |
| 2006/0064960 A1 | | 3/2006 | Johnson | |

* cited by examiner

*Primary Examiner* — Andrew Nguyen
(74) *Attorney, Agent, or Firm* — Krieg DeVault LLP (57) ABSTRACT

The present invention provides a variable pressure ratio gas turbine. In an embodiment, the engine is configured to selectively bypass all or a portion of a high pressure compressor and a high pressure turbine. In an embodiment, during bypass operation, all or a portion of the flow that would otherwise pass through the high pressure compressor and the high pressure turbine may be routed through a respective compressor bypass duct and turbine bypass duct.

23 Claims, 5 Drawing Sheets

VARIABLE PRESSURE RATIO GAS TURBINE ENGINE

CROSS REFERENCE TO RELATED APPLICATIONS

The present application claims the benefit of U.S. Provisional Patent Application 61/203,863, filed Dec. 30, 2008, and is incorporated herein by reference.

FIELD OF THE INVENTION

The present invention relates to gas turbine engines, and, more particularly, to a variable pressure ratio gas turbine engine.

BACKGROUND

Variable pressure ratio gas turbine engines may be employed for different purposes, such as, for example, subsonic flight and supersonic flight, in which exemplary case, one pressure ratio may be desirable for subsonic flight and another pressure ratio may be desirable for supersonic flight.

SUMMARY

The present invention provides a variable pressure ratio gas turbine engine. In an embodiment, the engine is configured to selectively bypass all or a portion of a high pressure compressor and/or a high pressure turbine. In an embodiment, during bypass operation, all or a portion of the flow that would otherwise pass through the high pressure compressor and the high pressure turbine may be routed through a respective compressor bypass duct and turbine bypass duct.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Figure 1:
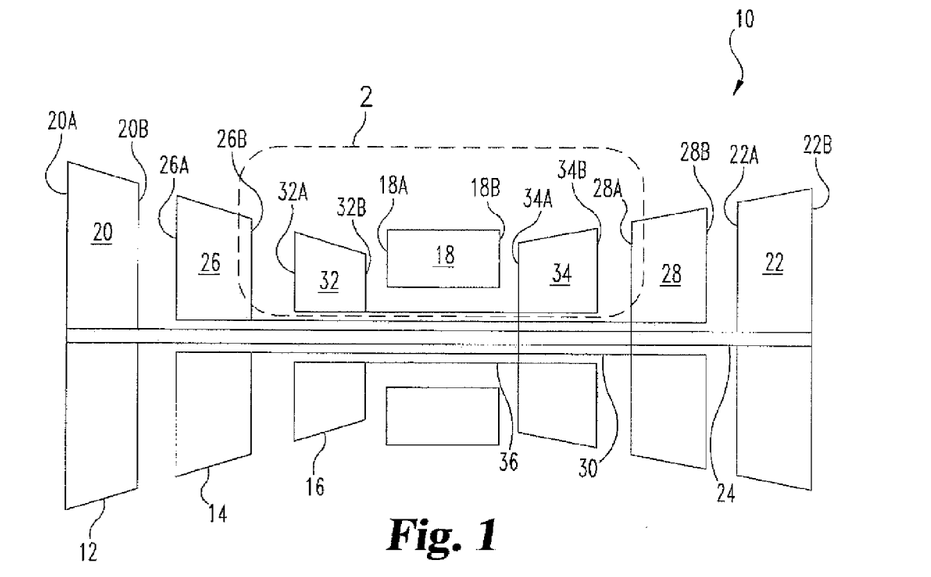
FIG. 1 is a schematic view of a gas turbine engine in accordance with an embodiment of the present invention.

Referring now to the drawings, and in particular FIG. 1, a non-limiting example of a gas turbine engine 10 in accordance with an embodiment of the present invention is depicted. In one form, gas turbine engine 10 is a variable cycle engine of a three-spool mixed-flow turbofan configuration, e.g., such as might be employed as a propulsion powerplant for a fixed-wing aircraft. In one form, gas turbine engine 10 operates at a variable pressure ratio by selectively bypassing all or a portion of the high pressure spool. In other embodiments, gas turbine engine 10 may have any number of spools, and may be a turbofan, turboshaft, turbojet or turboprop engine.

In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein. In one form, gas turbine engine 10 includes a low pressure spool 12, an intermediate pressure spool 14, a high pressure spool 16 and a combustor 18. Combustor 18 includes an inlet 18A and an outlet 18B.

In one form, low pressure spool 12 includes a low pressure compressor 20, a low pressure turbine 22 and an inner shaft 24 coupling low pressure turbine 22 with low pressure compressor 20. In the present embodiment, low pressure compressor 20 includes one or more fan stages, although it is considered that in other embodiments, low pressure compressor 20 may not include fan stages.

In one form, intermediate pressure spool 14 includes an intermediate pressure compressor 26, an intermediate pressure turbine 28 and an intermediate pressure turbine 28. Intermediate pressure turbine 28 is mechanically coupled to intermediate pressure compressor 26 via intermediate shaft 30. Intermediate shaft 30 transmits power through intermediate shaft 30 to drive intermediate pressure compressor 26. In one form, intermediate pressure compressor 26 includes fan stages. In other embodiments, intermediate pressure compressor 26 may not include fan stages.

In one form, high pressure spool 16 includes a high pressure compressor 32, a high pressure turbine 34 and an outer shaft 36. High pressure turbine 34 is coupled to high pressure compressor 32 via outer shaft 36. Mechanical power generated in high pressure turbine 34 is transmitted to high pressure compressor 32 via outer shaft 36.

Intermediate pressure compressor 26 is a lower pressure compressor than high pressure compressor 32, i.e., operates at lower pressures than does high pressure compressor 32. Low pressure compressor 20 is a lower pressure compressor than intermediate pressure compressor 26, i.e., operates at lower pressures than does intermediate pressure compressor 26. Similarly, intermediate pressure turbine 28 is a lower pressure turbine than high pressure turbine 34, and low pressure turbine 22 is a lower pressure turbine than intermediate pressure turbine 28.

Low pressure compressor 20 includes an inlet 20A and a discharge 20B. Inlet 20A receives air into gas turbine engine 10. Intermediate pressure compressor 26 includes an inlet 26A and a discharge 26B. Inlet 26A is in fluid communication with discharge 20B of low pressure compressor 20, and receives therefrom a pressurized airflow that is discharged from low pressure compressor 20.

High pressure compressor 32 includes an inlet 32A and a discharge 32B. Inlet 32A is in fluid communication with discharge 26B of intermediate pressure compressor 26, and, as described below, may receive therefrom a pressurized airflow that is discharged from intermediate pressure compressor 26. Discharge 32B of high pressure compressor 32 is in fluid communication with inlet 18A of combustor 18.

Combustor 18 receives pressurized air at inlet 18A from one or both of discharge 26B of intermediate pressure compressor 26 and discharge 32B of high pressure compressor 32. Combustor 18 adds fuel, and combusts the fuel and air to generate hot gases, which, are successively expanded through one or both of high pressure turbine 34 and intermediate pressure turbine 28, and are also expanded through low pressure turbine 22 to extract mechanical energy for driving respective high pressure compressor 32, intermediate pressure compressor 26 and low pressure compressor 20, as well as to provide jet thrust at exit 22B of low pressure turbine 22.

High pressure turbine 34 includes an inlet 34A and an exit 34B. Inlet 34A may receive hot gases from outlet 18B of combustor 18.

Intermediate pressure turbine 28 includes an inlet 28A and an exit 28B. Inlet 28A of intermediate turbine may receive hot gases from one or both of exit 34B of high pressure turbine 34 and outlet 18B of combustor 18.

Low pressure turbine 22 includes an inlet 22A and an exit 22B. Inlet 22A receives hot gases from exit 28B of intermediate pressure turbine 28.

Figure 2:
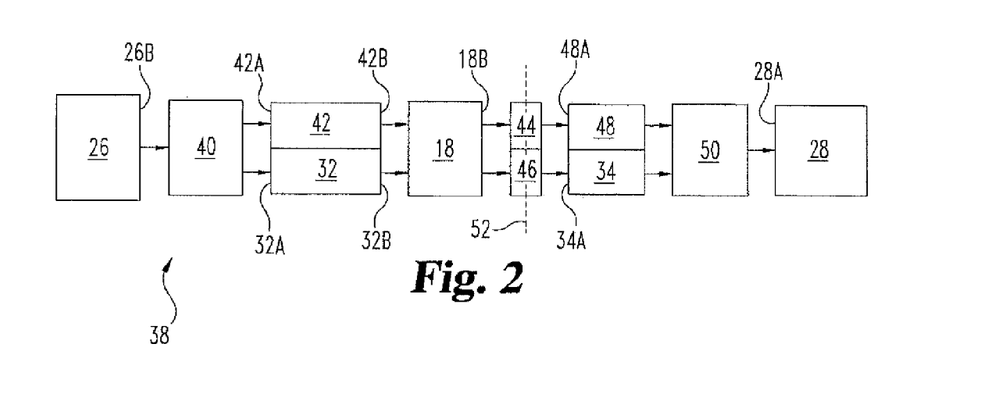
FIG. 2 schematically depicts a flow control system of the gas turbine engine of FIG. 1.

Referring now to FIG. 2, gas turbine engine 10 includes an integrated flow control system 38. Flow control system 38 is integrated into gas turbine engine 10 in the present embodiment, having components dispersed throughout a portion of gas turbine engine 10. Flow control system 38 is employed in the present invention to bypass part or all of high pressure spool 16, i.e., high pressure compressor 32 and high pressure turbine 34. The depiction of FIG. 2 schematically illustrates an embodiment of flow control system 38 in a generic form, some non-limiting possible variations of which are illustrated in subsequent other Figures and subsequently described with respect thereto.

In the embodiment of FIG. 2, various features, components and interrelationships therebetween of aspects of an embodiment of the present invention are depicted. However, the present invention is not limited to the particular embodiment of FIG. 2 and the components, features and interrelationships therebetween as are illustrated in FIG. 2 and described herein.

Flow control system 38 of the present embodiment includes a movable compressor flow guide 40, a compressor bypass flowpath 42, an independently variable turbine nozzle 44, an independently variable turbine nozzle 46, a turbine bypass flowpath 48 and a movable turbine flow guide 50. Each of moveable flow guides 40 and 50 may be, for example, an iris nozzle or interleaved leaf configuration. Other configurations may be employed without departing from the scope of the present invention.

Compressor bypass flowpath 42 is in fluid communication with discharge 26B of intermediate pressure compressor 26. Compressor bypass flowpath 42 includes an inlet 42A and a discharge 42B. Both inlet 32A of high pressure compressor 32 and inlet 42A of compressor bypass flowpath 42 are in fluid communication with discharge 26B of intermediate pressure compressor 26. Thus, high pressure compressor 32 and compressor bypass flowpath 42 are arranged in parallel fluid communication with discharge 26B of intermediate pressure compressor 26.

High pressure compressor 32 and compressor bypass flowpath 42 are in fluid communication with discharge 26B of intermediate pressure compressor 26 via movable compressor flow guide 40, which is fluidly disposed between intermediate pressure compressor 26 and the inlets 32A and 42A of high pressure compressor 32 and compressor bypass flowpath 42, respectively. Movable compressor flow guide 40 is structured to selectively direct the intermediate pressure compressor 26 discharge flow exiting intermediate pressure compressor 26 to a selected one or both of high pressure compressor 32 and compressor bypass flowpath 42.

As that term is used herein, "selectively" means that the recited component is controllably operated so as move from one selected position to one or more other selected positions. For example, regarding flow guide 40, in one form, it is meant that flow guide 40 directs the intermediate pressure compressor discharge flow to one or both of high pressure compressor 32 and compressor bypass flowpath 42 in response to a control input. In one form, the control input results from a human selection of an operating mode, e.g., via a flight control computer (not shown) or an engine controller (not shown), which directs an actuator (not shown) to change the position of flow guide 40. In other embodiments, the control input may be a selection based on sensed conditions, such as pressures and/or temperatures, which are employed via a control algorithm to direct an actuator (not shown) to change the position of flow guide 40. In still other embodiments, the control input may be a selection based on pressures and/or temperatures that act upon a mechanism (not shown), which changes the position of flow guide 40.

Some non-limiting embodiments of the present invention contemplate that moveable compressor flow guide 40 may be structured to selectively direct intermediate pressure compressor 26 discharge flow to a destination selected from between at least two of: inlet 32A of high pressure compressor 32; inlet 42A of compressor bypass flowpath 42; and both inlet 32A of high pressure compressor 32 and inlet 42A of compressor bypass flowpath 42. That is, in one form, intermediate pressure compressor 26 discharge flow may be directed into either inlet 32A of high pressure compressor 32 or inlet 42A of compressor bypass flowpath 42 under the action of moveable compressor flow guide 40. In another embodiment, intermediate pressure compressor 26 discharge flow may be directed into either inlet 32A of high pressure compressor 32, or directed into both inlet 32A of high pressure compressor 32 and inlet 42A of compressor bypass flowpath 42 under the action of moveable compressor flow guide 40. In yet another embodiment, intermediate pressure compressor 26 discharge flow may be directed into inlet 42A of compressor bypass flowpath 42, or directed into both inlet 32A of high pressure compressor 32 and inlet 42A of compressor bypass flowpath 42 under the action of moveable compressor flow guide 40. In still another embodiment, intermediate pressure compressor 26 discharge flow may be directed into inlet 32A of high pressure compressor 32, directed into inlet 42A of compressor bypass flowpath 42, or directed into both inlet 32A of high pressure compressor 32 and inlet 42A of compressor bypass flowpath 42 under the action of moveable compressor flow guide 40

For example, in one form, movable compressor flow guide 40 may be movable by an actuation system (not shown) between two or more selectable positions so as to direct the discharge flow exiting intermediate pressure compressor 26 to a selected one or both of two selected downstream components or destinations, such as high pressure compressor 32 and/or compressor bypass flowpath 42. In one such form, movable compressor flow guide 40 may be structured to move between two positions by an actuation system (not shown), whereby in one position all of the intermediate pressure compressor 26 discharge flow may be directed into inlet 32A of high pressure compressor 32, whereas in the other position, all of the intermediate pressure compressor 26 discharge flow may be directed into inlet 42A of compressor bypass flowpath 42.

As another example, movable compressor flow guide 40 may be structured to move between two positions by an actuation system (not shown); one position of which may direct intermediate pressure compressor 26 discharge flow into only inlet 32A of high pressure compressor 32, whereas the other position may direct the intermediate pressure compressor 26 discharge flow into both of inlet 32A of high pressure compressor 32 and inlet 42A of compressor bypass flowpath 42.

In yet other embodiments, movable compressor flow guide 40 may be structured to move between three positions by an actuation system (not shown), e.g., so as to be able to direct intermediate pressure compressor 26 discharge flow into a selected one or both of high pressure compressor 32 and compressor bypass flowpath 42. For example, movable compressor flow guide 40 may be structured to direct intermediate pressure compressor 26 discharge flow into either high pressure compressor 32 or compressor bypass flowpath 42, or both high pressure compressor 32 and compressor bypass flowpath 42. In still other embodiments, movable compressor flow guide 40 may be structured to move between more than three positions by an actuation system (not shown).

Discharge 32B of high pressure compressor 32 is in fluid communication with inlet 18A of combustor 18. Discharge 42B of compressor bypass flowpath 42 is in fluid communication with inlet 18A of combustor 18 in parallel with discharge 32B.

In one form, turbine bypass flowpath 48 has an inlet 48A in fluid communication with outlet 18B of combustor 18 via independently variable turbine nozzle 44. In one form, turbine bypass flowpath 48 is in fluid communication with inlet 28A of intermediate pressure turbine 28 via moveable turbine flow guide 50. In one form, turbine bypass flowpath is disposed in parallel fluid communication with high pressure turbine 34 between combustor 18 and intermediate pressure turbine 28. In one form, independently variable turbine nozzle 44 is structured to selectively open and close inlet 48A of turbine bypass flowpath 48, e.g., by the use of an actuation system (not shown). In one form, independently variable turbine nozzle 44 includes a plurality of rotatable turbine vanes 44A (see FIG. 3) that are structured to rotate about an axis, e.g., an axis 52 that is approximately perpendicular to the direction of flow through turbine bypass flowpath 48. In other embodiments, axis 52 may be oriented otherwise. In still other embodiments, other types of variable nozzles may be employed to selectively open and close the inlet of turbine bypass flowpath 48. In yet other embodiments, independently variable nozzle 44 is operative to selectively close the inlet of turbine bypass flowpath 48, open the inlet of turbine bypass flowpath 48 or modulate the flow passing through independently variable nozzle 44 into turbine bypass flowpath 48 to one or more desired values between a minimum and a maximum value.

Inlet 34A of high pressure turbine 34 is in fluid communication with outlet 18B of combustor 18 via independently variable turbine nozzle 46. Inlet 34A is in fluid communication with combustor 18 in parallel with inlet 48A of turbine bypass flowpath 48. In one form, variable turbine nozzle 46 is structured to selectively open and close inlet 34A of high pressure turbine 34, e.g., by the use of an actuation system (not shown). In one form, independently variable turbine nozzle 46 includes a plurality of rotatable turbine vanes 46A (see FIG. 3) that are structured to rotate about an axis, e.g., the same axis 52 about which a turbine vane 44A of variable turbine nozzle 44 rotates. In other embodiments, rotatable turbine vanes 46A may rotate about another axis that is oriented in another direction. In still other embodiments, other types of variable nozzles may be employed to selectively open and close the inlet of high pressure turbine 34. In yet other embodiments, independently variable nozzle 46 is operative to selectively close the inlet of high pressure turbine 34, open the inlet of high pressure turbine 34 or modulate the flow passing through independently variable nozzle 46 into high pressure turbine 34 to one or more desired values between a minimum and a maximum value.

In one form, turbine bypass flowpath 48 has an exit 48B in fluid communication with inlet 28A of intermediate pressure turbine 28. In one form, turbine bypass flowpath 48 is in fluid communication with intermediate pressure turbine 28 via moveable turbine flow guide 50. In one form, moveable turbine flow guide 50 is structured, e.g., in conjunction with variable turbine nozzle 44 and variable turbine nozzle 46, to selectively permit the combustor outlet flow exiting combustor 18 to pass through a selected one or both of high pressure turbine 34 and turbine bypass flowpath 48, the latter of which results in flow being directed through intermediate pressure turbine 28.

By virtue of independently variable turbine nozzle 44 and independently variable turbine nozzle 46, flow control system 38 is structured to selectively couple outlet 18B of combustor 18 to a selected one or both of inlet 34A of high pressure turbine 34 and inlet 28A of intermediate pressure turbine 28. As with moveable compressor flow guide 40, moveable turbine flow guide is structured to selectively direct flow to a destination selected from at least two possible destinations, depending upon the particular embodiment. In one form, moveable turbine flow guide 50 is moveable between two positions by an actuation system (not shown) to direct hot gases from a selected one of turbine bypass flowpath 48 (via independently variable turbine nozzle 44) and high pressure turbine 34 (via upstream independently variable turbine nozzle 46) into inlet 28A of intermediate pressure turbine 28. In other embodiments, moveable turbine flow guide 50 is moveable between three positions by an actuation system (not shown) to selectively direct hot gases from either turbine bypass flowpath 48, high pressure turbine 34 or both turbine bypass flowpath 48 and high pressure turbine 34 into inlet 28A of intermediate pressure turbine 28.

Variable turbine nozzle 44 and variable turbine nozzle 46 are independently variable turbine nozzles. Variable turbine nozzle 46 is structured to selectively allow and prevent flow from outlet 18B of combustor 18 to high pressure turbine 34 independently of the operation of variable turbine nozzle 44. Similarly, variable turbine nozzle 44 is structured to selectively allow and prevent flow from outlet 18B of combustor to intermediate pressure turbine 28 independently of the operation of variable turbine nozzle 46.

Figure 3:
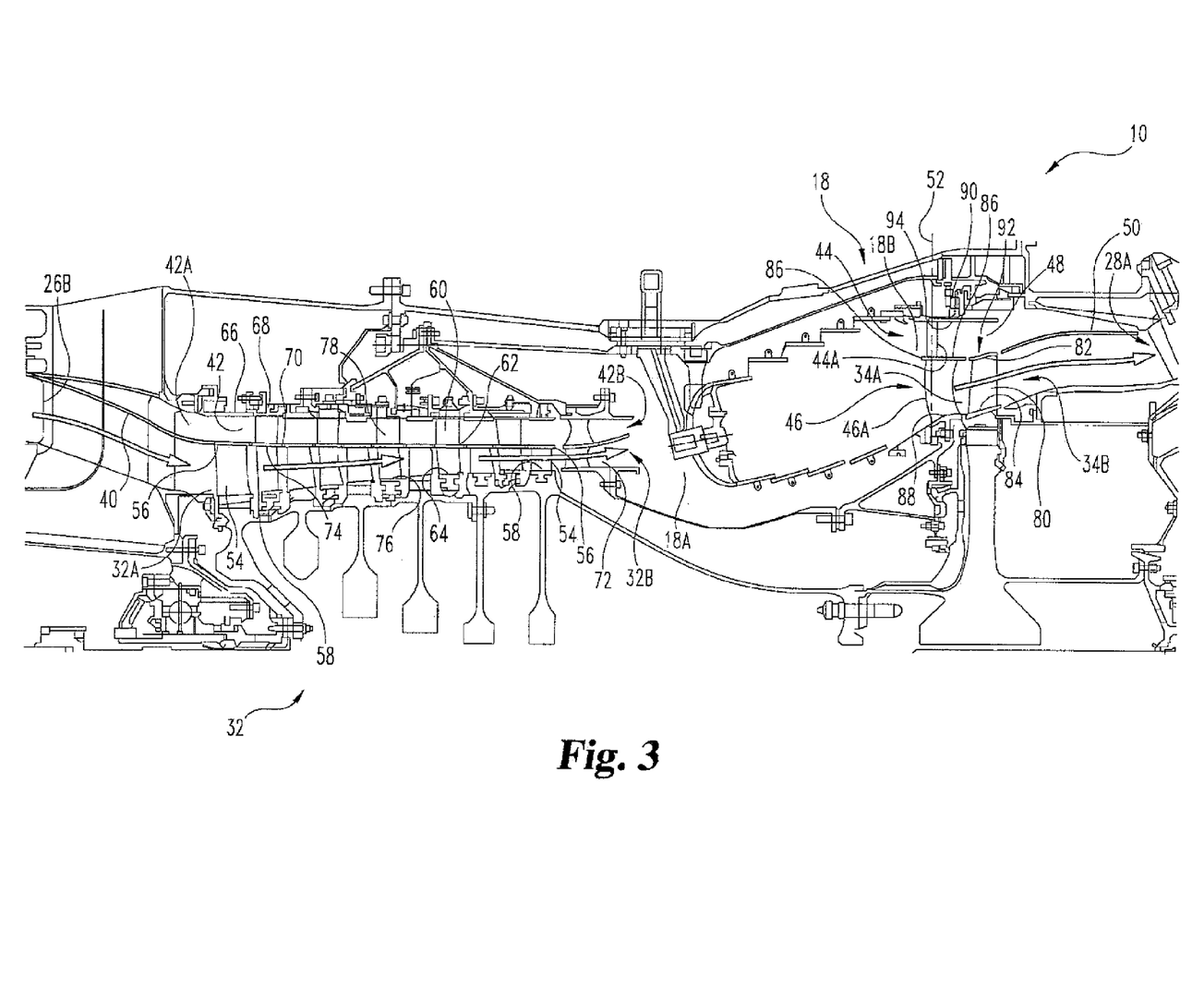
FIG. 3 is a partial cross section of a gas turbine engine with a flow control system in accordance with an embodiment of the present invention, illustrating gas turbine engine operation at a given pressure ratio.

Referring now to FIG. 3, a non-limiting example of an embodiment of gas turbine engine 10 with flow control system 38 in one form is depicted. In the embodiment of FIG. 3, various features, components and interrelationships therebetween of aspects of an embodiment of the present invention are depicted. However, the present invention is not limited to the particular embodiment of FIG. 3 and the components, features and interrelationships therebetween as are illustrated in FIG. 3 and described herein.

In the embodiment of FIG. 3, high pressure compressor 32 includes a plurality of shrouded compressor blades and shrouded compressor vanes. For example, in one form, compressor blades 54 include tip shrouds 56 and platforms 58; and compressor vanes 60 include midspan shrouds 62 and platforms 64. In one form, compressor bypass flowpath 42 is defined by an outer flowpath wall 66 formed by a compressor case structure 68, and defined by an inner flowpath wall 70 formed by tip shrouds 56 and midspan shrouds 62.

Similarly, in one form, a high pressure compressor flowpath 72 is defined by an outer flowpath wall 74 formed by tip shrouds 56 and midspan shrouds 62, and defined by an inner flowpath wall 76 formed by platforms 58 of compressor blades 54 and platforms 64 of compressor vanes 60. In one form, compressor vanes 60 include airfoils 78 that extend between flowpath wall 74 and flowpath wall 66.

High pressure turbine 34 in the embodiment of FIG. 3 includes a plurality of shrouded turbine blades 80. In one form, turbine blades 80 include tip shrouds 82 and platforms 84, which define, in part, a flowpath through high pressure turbine 34. In one form, turbine vanes 46A include shrouds 86 and platforms 88 which also define, in part, a flowpath through high pressure turbine 34. Shrouds 86 and a turbine case structure 90 form an inner flowpath wall 92 and an outer flowpath wall 94, respectively, which define turbine bypass flowpath 48. In one form, moveable turbine flow guide 50 forms a part of inner flowpath wall 92.

In the depiction of FIG. 3, moveable compressor flow guide 40 is illustrated as having been moved into a position to direct all of the pressurized air flow exiting intermediate pressure compressor 26 into high pressure compressor 32. In addition, variable turbine nozzle 44 is closed, thus preventing flow from outlet 18B of combustor 18 into turbine bypass flowpath 48. Variable turbine nozzle 46 is open, and moveable turbine flow guide 50 is positioned to permit flow from outlet 18B of combustor 18 to pass through high pressure turbine 34.

Figure 4:
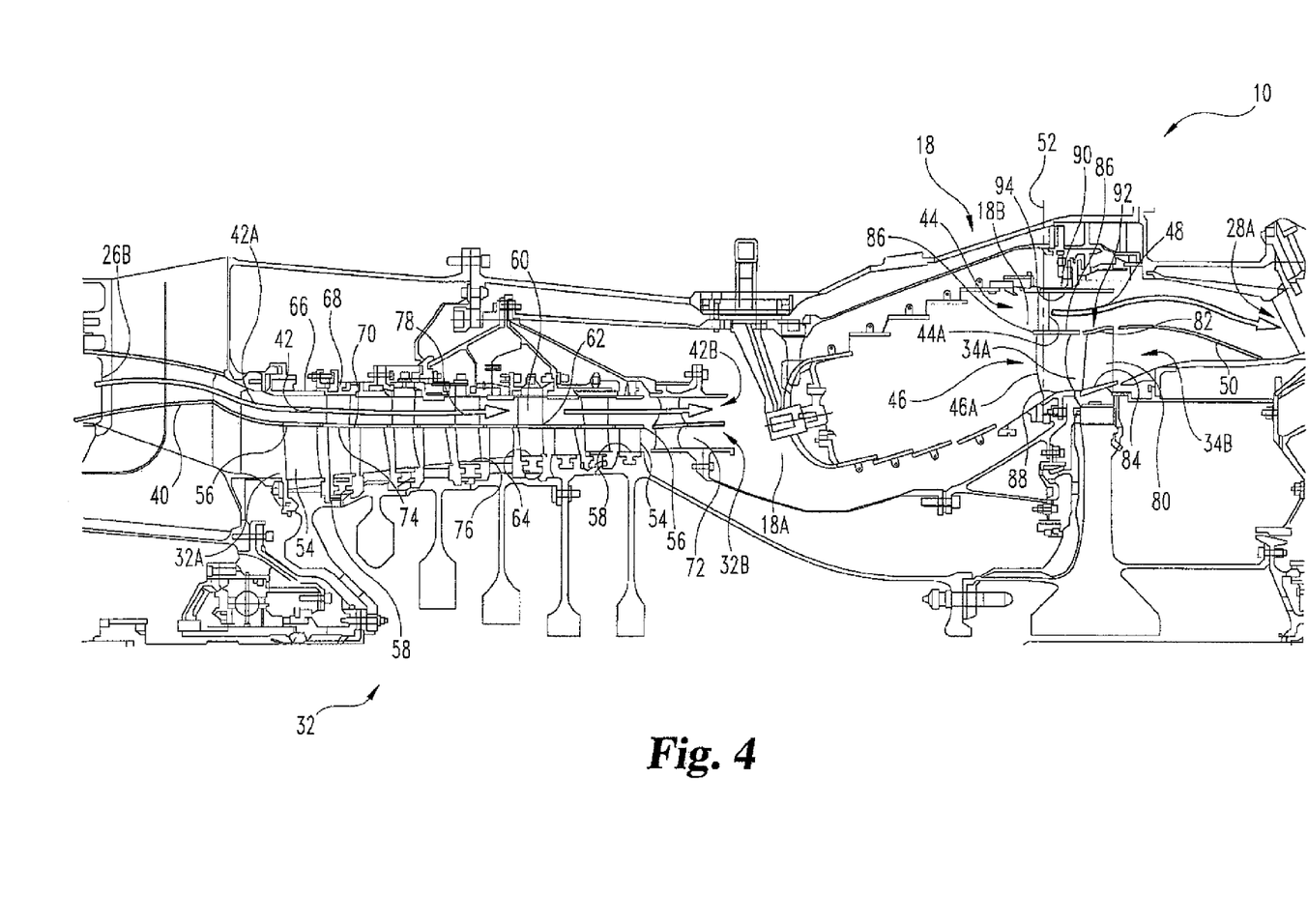
FIG. 4 illustrates the gas turbine engine and flow control system embodiment of FIG. 3 with the gas turbine engine operating at a different pressure ratio.

Referring now to FIG. 4, the embodiment of FIG. 3 is illustrated with moveable compressor flow guide 40, independently variable turbine nozzles 44 and 46, and moveable turbine flow guide 50 positioned to bypass high pressure compressor 32 and high pressure turbine 34, unlike the depiction of FIG. 3, wherein the flow was directed through high pressure compressor 32 and high pressure turbine 34.

In the depiction of FIG. 4, moveable compressor flow guide 40 is illustrated as having been moved into a position to direct all of the pressurized air flow exiting intermediate pressure compressor 26 into compressor bypass flowpath 42, thus bypassing high pressure compressor 32. In addition, variable turbine nozzle 46 is closed, thus preventing flow from outlet 18B of combustor 18 into high pressure turbine 34. Variable turbine nozzle 44 is open, and moveable turbine flow guide 50 is positioned to permit flow from outlet 18B of combustor 18 to pass through turbine bypass flowpath 48, thus directing the flow from combustor 18 to intermediate pressure turbine 28. The bypass operation depicted in FIG. 4 may be desirable under certain flight conditions, e.g., such as supersonic flight, whereas the depiction of FIG. 3 may be desirable in other flight conditions, e.g., such as subsonic flight.

Figure 5:
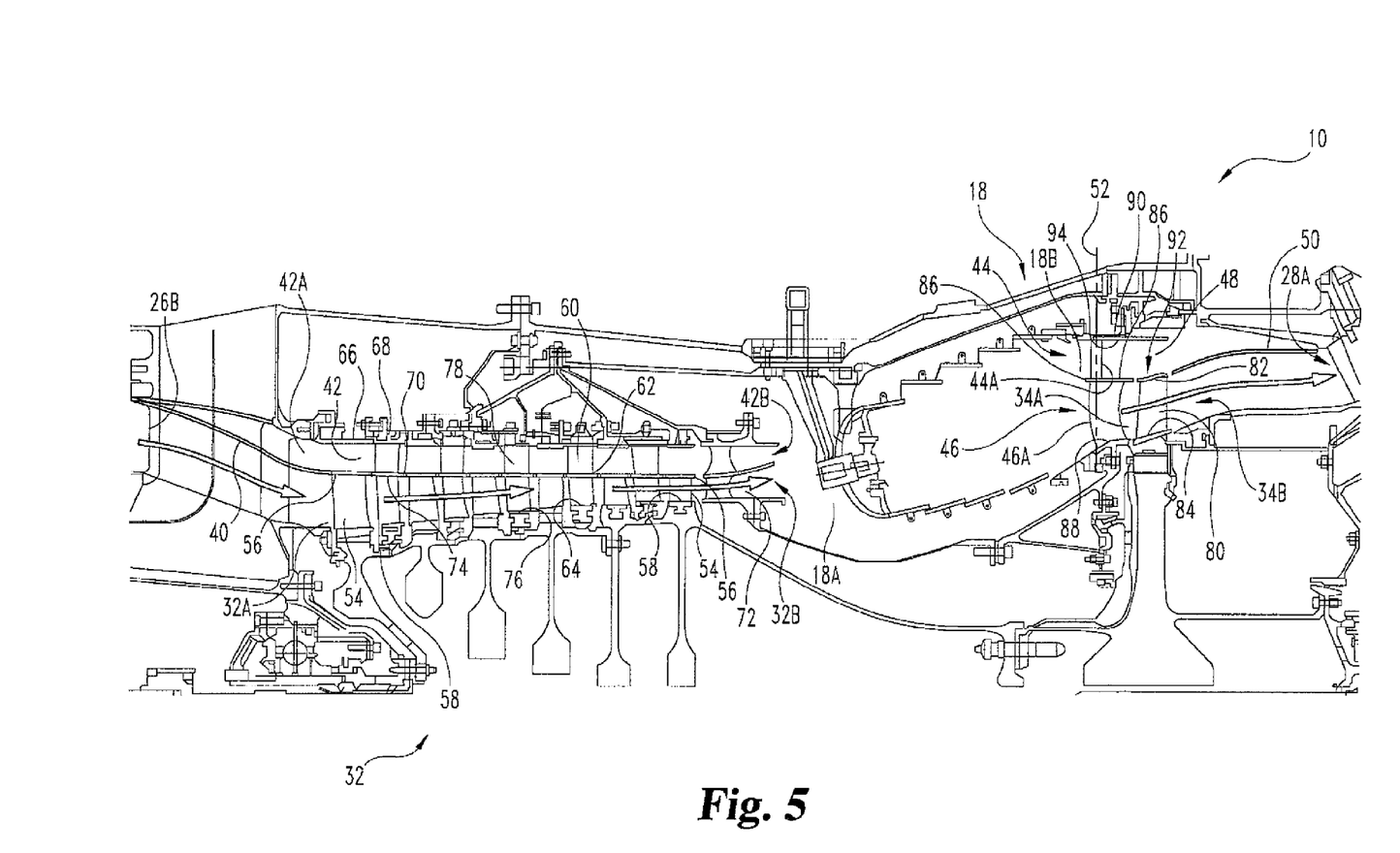
FIG. 5 is a partial cross section of a gas turbine engine with a flow control system in accordance with an embodiment of the present invention, illustrating gas turbine engine operation at a given pressure ratio.

Referring now to FIG. 5, a non-limiting example of an embodiment of gas turbine engine 10 with flow control system 38 in another form is depicted. In the embodiment of FIG. 5, various features, components and interrelationships therebetween of aspects of an embodiment of the present invention are depicted. However, the present invention is not limited to the particular embodiment of FIG. 5 and the components, features and interrelationships therebetween as are illustrated in FIG. 5 and described herein.

In the depiction of FIG. 5, moveable compressor flow guide 40 is illustrated as having been moved into a position to direct all of the pressurized air flow exiting intermediate pressure compressor 26 into high pressure compressor 32. In addition, variable turbine nozzle 44 is closed, thus preventing flow from outlet 18B of combustor 18 into turbine bypass flowpath 48. Variable turbine nozzle 46 is open, and moveable turbine flow guide 50 is positioned to permit flow from outlet 18B of combustor 18 to pass through high pressure turbine 34.

Figure 6:
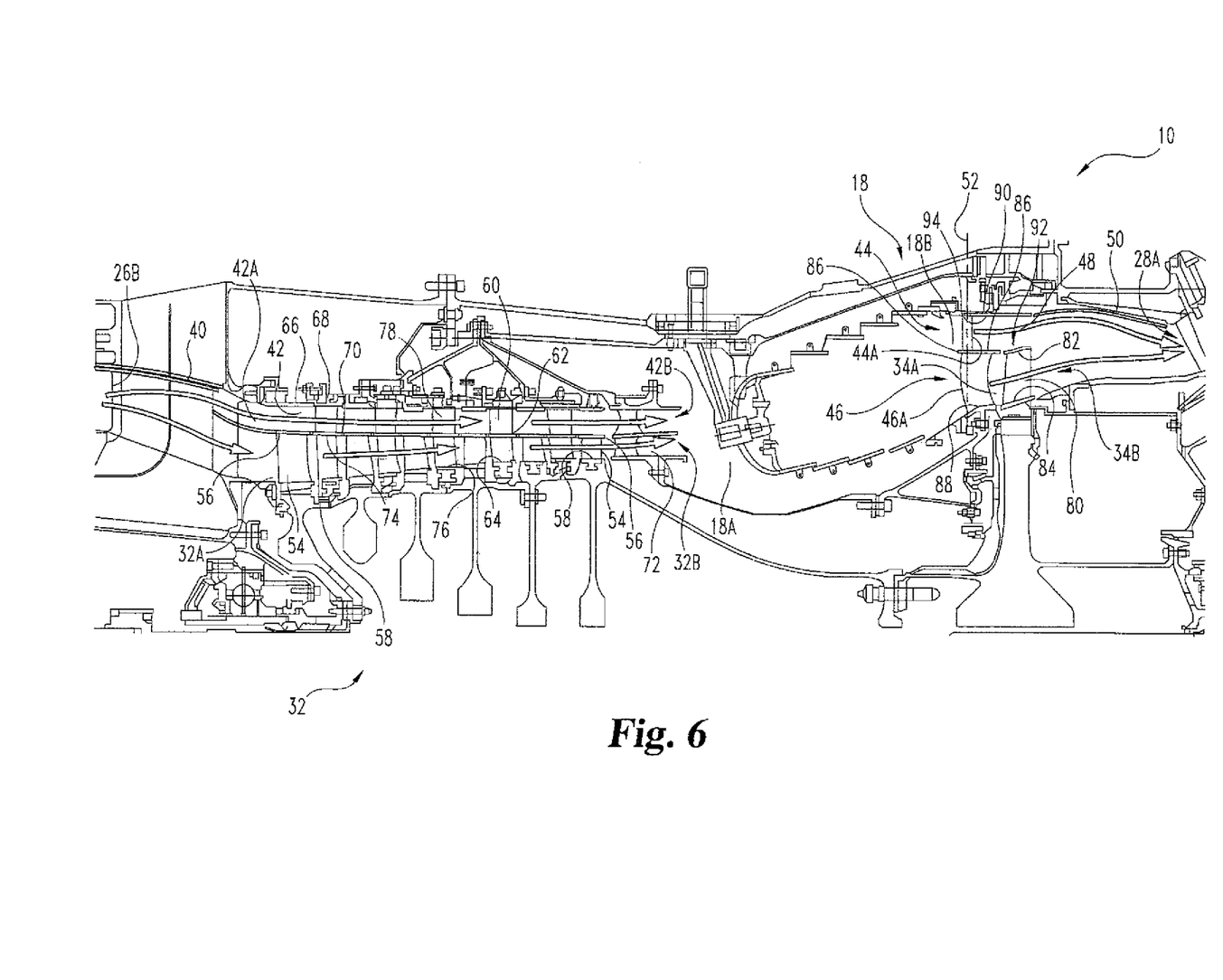
FIG. 6 illustrates the gas turbine engine and flow control system embodiment of FIG. 5, illustrating gas turbine engine operation at a pressure ratio different than that of FIGS. 3-5.

Referring now to FIG. 6, the embodiment of FIG. 5 is illustrated with moveable compressor flow guide 40, independently variable turbine nozzles 44 and 46, and moveable turbine flow guide 50 positioned to permit flow through both high pressure compressor 32 and compressor bypass flowpath 42, as well as both high pressure turbine 34 and turbine bypass flowpath 48, unlike the depiction of FIG. 5, wherein all the flow is directed through high pressure compressor 32 and high pressure turbine 34.

In the depiction of FIG. 6, moveable compressor flow guide 40 is illustrated as having been moved into a position to direct the pressurized air flow exiting intermediate pressure compressor 26 into both high pressure compressor 32 and compressor bypass flowpath 42. In addition, variable turbine nozzle 46 is open, variable turbine nozzle 44 is open, and moveable turbine flow guide 50 is positioned to permit flow from outlet 18B of combustor 18 to pass through high pressure turbine 34 and turbine bypass flowpath 48, from whence the flow is directed to intermediate pressure turbine 28. The bypass operation depicted in FIG. 6 may be desirable under certain flight conditions, e.g., such as supersonic flight, whereas the depiction of FIG. 5 may be desirable in other flight conditions, e.g., such as subsonic flight.

Embodiments of the present invention may include a variable pressure ratio gas turbine engine, including a high pressure spool having a high pressure turbine and a high pressure compressor mechanically driven by the high pressure turbine; a lower pressure spool having a lower pressure turbine and a lower pressure compressor mechanically driven by the lower pressure turbine; a combustor; and a flow control system structured to selectively provide flow to the combustor from the high pressure compressor and the lower pressure compressor.

An inlet of the high pressure compressor may be in fluid communication with a discharge of the lower pressure compressor. The gas turbine engine may further include a compressor bypass flowpath in parallel fluid communication with the discharge of the lower pressure compressor as with respect to the inlet of the high pressure compressor. The flow control system may include a moveable compressor flow guide structured to selectively direct the lower pressure compressor discharge flow exiting the lower pressure compressor to a selected one of the high pressure compressor and the compressor bypass flowpath. The flow control system may include a moveable compressor flow guide structured to selectively direct a lower pressure compressor discharge flow into a destination selected from between at least two of: the inlet of the high pressure compressor; an inlet of the compressor bypass flowpath; and both the inlet of the high pressure compressor and the inlet of the compressor bypass flowpath. The moveable compressor flow guide may be positioned upstream of the high pressure compressor.

The high pressure compressor may employ a plurality of shrouded compressor blades, wherein the compressor bypass flowpath has an inner flowpath wall formed in part by shrouds of the shrouded compressor blades.

The gas turbine engine may include means for selectively bypassing the high pressure compressor.

The gas turbine engine may also include a high pressure turbine drivingly coupled to the high pressure compressor; and a lower pressure turbine drivingly coupled to the lower pressure compressor, wherein the flow control system is structured to selectively couple the outlet of the combustor to a selected one of an inlet of the high pressure turbine and an inlet of the lower pressure turbine.

The inlet of the high pressure turbine may be in fluid communication with the outlet of the combustor, and the gas turbine engine may further include a turbine bypass flowpath in parallel fluid communication with the outlet of the combustor as with respect to the inlet of the high pressure turbine.

The flow control system may include a moveable turbine flow guide structured to selectively permit the combustor output flow exiting the combustor to pass through a selected one of the high pressure turbine and the turbine bypass flowpath. The flow control system may include a moveable turbine flow guide structured to selectively permit the combustor output flow exiting the combustor to pass into a destination selected from between at least two of: the high pressure turbine; the turbine bypass flowpath; and both the inlet of the high pressure turbine and an inlet of the turbine bypass flowpath.

The gas turbine engine may include a variable turbine nozzle structured to selectively open and close the inlet of the high pressure turbine.

The gas turbine engine may include a variable turbine nozzle structured to selectively open and close an inlet of the turbine bypass flowpath.

The gas turbine engine may include two independently variable turbine nozzles, wherein one of the independently variable turbine nozzles is structured to selectively open and close the inlet of the high pressure turbine and the other of the independently variable turbine nozzles is structured to selectively open and close an inlet of the turbine bypass flowpath. Each independently variable turbine nozzle may have a turbine vane rotatable about a same axis of rotation as a corresponding turbine vane of the other independently variable turbine nozzle The gas turbine engine may include two independently variable turbine nozzles, wherein one of the independently variable turbine nozzles is structured to selectively allow and prevent flow from the outlet of the combustor to the high pressure turbine and the other of the independently variable turbine nozzles is structured to selectively allow and prevent flow from the outlet of the combustor to the lower pressure turbine. Each independently variable turbine nozzle may have a turbine vane rotatable about a same axis of rotation as a corresponding turbine vane of the other independently variable turbine nozzle.

The gas turbine engine may include means for bypassing the high pressure turbine, and may include means for bypassing both the high pressure compressor and the high pressure turbine without bypassing the combustor.

The high pressure turbine may employ a plurality of shrouded turbine blades, wherein the turbine bypass flowpath has an inner flowpath wall formed in part by shrouds of the shrouded turbine blades.

Embodiments of the present may include a gas turbine engine, including a higher pressure spool having a higher pressure compressor mechanically driven by the higher pressure turbine; a lower pressure spool having a lower pressure turbine and a lower pressure compressor mechanically driven by the lower pressure turbine; a combustor; and means for selectively providing the discharge flow of the lower pressure compressor to at least one of the higher pressure compressor and the combustor.

Embodiments of the present invention may include a gas turbine engine, including a higher pressure spool having a higher pressure compressor mechanically driven by the higher pressure turbine; a lower pressure spool having a lower pressure turbine and a lower pressure compressor mechanically driven by the lower pressure turbine; a combustor; and means for selectively fluidly coupling the outlet of the combustor with at least one of the high pressure turbine and the low pressure turbine.

Embodiments of the present invention may include a variable pressure ratio gas turbine engine, comprising: a first spool having a first turbine and a first compressor mechanically driven by the first turbine, the first spool having a first pressure ratio; a second spool having a second turbine and a second compressor mechanically driven by the second turbine, the second spool having a second pressure ratio different from the first pressure ratio; a combustor; and a flow control system structured to selectively provide flow to the combustor from the first compressor and the second compressor.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A variable pressure ratio gas turbine engine, comprising:
   a high pressure spool having a high pressure turbine and a high pressure compressor mechanically driven by said high pressure turbine;
   a lower pressure spool having a lower pressure turbine and a lower pressure compressor mechanically driven by said lower pressure turbine;
   a combustor; and
   a flow control system structured to selectively provide flow to said combustor from said high pressure compressor and said lower pressure compressor,
   wherein an inlet of said high pressure compressor is in fluid communication with a discharge of said lower pressure compressor, further comprising a compressor bypass flowpath in parallel fluid communication with the discharge of said lower pressure compressor with respect to the inlet of said high pressure compressor; and
   wherein said high pressure compressor employs a plurality of shrouded compressor blades, and wherein said compressor bypass flowpath has an inner flowpath wall formed in part by shrouds of said shrouded compressor blades.

2. The gas turbine engine of claim 1, wherein said flow control system includes a moveable compressor flow guide structured to selectively direct the lower pressure compressor discharge flow exiting said lower pressure compressor to a selected one of said high pressure compressor and said compressor bypass flowpath.

3. The gas turbine engine of claim 1, wherein said flow control system includes a moveable compressor flow guide structured to selectively direct a lower pressure compressor discharge flow into a destination selected from between at least two of:
   said inlet of said high pressure compressor;
   an inlet of said compressor bypass flowpath; and
   both said inlet of said high pressure compressor and said inlet of said compressor bypass flowpath.

4. The gas turbine engine of claim 3, wherein said moveable compressor flow guide is positioned upstream of said high pressure compressor.

5. The gas turbine engine of claim 1, further comprising means for selectively bypassing said high pressure compressor.

6. The gas turbine engine of claim 1,
   wherein said high pressure turbine is drivingly coupled to said high pressure compressor;
   wherein said lower pressure turbine is drivingly coupled to said lower pressure compressor; and
   wherein said flow control system is structured to selectively couple an outlet of said combustor to a selected one of an inlet of said high pressure turbine and an inlet of said lower pressure turbine.

7. The gas turbine engine of claim 6, wherein said inlet of said high pressure turbine is in fluid communication with said outlet of said combustor, further comprising a turbine bypass flowpath in parallel fluid communication with said outlet of said combustor with respect to said inlet of said high pressure turbine.

8. The gas turbine engine of claim 7, wherein said flow control system includes a moveable turbine flow guide structured to selectively permit the combustor output flow exiting said combustor to pass through a selected one of said high pressure turbine and said turbine bypass flowpath.

9. The gas turbine engine of claim 7, wherein said flow control system includes a moveable turbine flow guide structured to selectively permit the combustor output flow exiting said combustor to pass into a destination selected from between at least two of:
   said inlet of said high pressure turbine;
   an inlet of said turbine bypass flowpath; and
   both said inlet of said high pressure turbine and said inlet of said turbine bypass flowpath.

10. The gas turbine engine of claim 7, further comprising a variable turbine nozzle structured to selectively open and close said inlet of said high pressure turbine.

11. The gas turbine engine of claim 7, further comprising a variable turbine nozzle structured to selectively open and close an inlet of said turbine bypass flowpath.

12. The gas turbine engine of claim 7, further comprising two independently variable turbine nozzles, wherein one of the independently variable turbine nozzles is structured to selectively open and close said inlet of said high pressure turbine and the other of the independently variable turbine nozzles is structured to selectively open and close an inlet of said turbine bypass flowpath.

13. The gas turbine engine of claim 12, wherein each independently variable turbine nozzle has a turbine vane rotatable about a same axis of rotation as a corresponding turbine vane of the other independently variable turbine nozzle.

14. The gas turbine engine of claim 6, further comprising two independently variable turbine nozzles, wherein one of the independently variable turbine nozzles is structured to selectively allow and prevent flow from the outlet of said combustor through the one of the independently variable turbine nozzles to said high pressure turbine and the other of the independently variable turbine nozzles is structured to selectively allow and prevent flow from the outlet of said combustor through the other of the independently variable turbine nozzles to said lower pressure turbine.

15. The gas turbine engine of claim 14, wherein each independently variable turbine nozzle has a turbine vane rotatable about a same axis of rotation as a corresponding turbine vane of the other independently variable turbine nozzle.

16. The gas turbine engine of claim 6, further comprising means for bypassing said high pressure turbine.

17. The gas turbine engine of claim 6, further comprising means for bypassing both said high pressure compressor and said high pressure turbine without bypassing said combustor.

18. The gas turbine engine of claim 7, wherein said high pressure turbine employs a plurality of shrouded turbine blades, and wherein said turbine bypass flowpath has an inner flowpath wall formed in part by shrouds of said shrouded turbine blades.

19. A gas turbine engine, comprising:
   a higher pressure spool having a higher pressure compressor mechanically driven by a higher pressure turbine;
   a lower pressure spool having a lower pressure turbine and a lower pressure compressor mechanically driven by said lower pressure turbine;
   a combustor; and
   means for selectively providing the discharge flow of said lower pressure compressor to at least one of said higher pressure compressor and said combustor,
   wherein an inlet of said higher pressure compressor is in fluid communication with a discharge of said lower pressure compressor, further comprising a compressor bypass flowpath in parallel fluid communication with the discharge of said lower pressure compressor with respect to the inlet of said higher pressure compressor; and
   wherein said higher pressure compressor employs a plurality of shrouded compressor blades, and wherein said compressor bypass flowpath has an inner flowpath wall formed in part by shrouds of said shrouded compressor blades.

20. A gas turbine engine, comprising:
   a higher pressure spool having a higher pressure compressor mechanically driven by a higher pressure turbine;
   a lower pressure spool having a lower pressure turbine and a lower pressure compressor mechanically driven by said lower pressure turbine;
   a combustor; and
   means for selectively fluidly coupling the outlet of said combustor with at least one of said higher pressure turbine and said lower pressure turbine
   wherein said higher pressure turbine is drivingly coupled to said higher pressure compressor; wherein said lower pressure turbine is drivingly coupled to said lower pressure compressor; and wherein said means for selectively fluidly coupling is structured to selectively couple an outlet of said combustor to a selected one of an inlet of said higher pressure turbine and an inlet of said lower pressure turbine;

wherein said inlet of said higher pressure turbine is in fluid communication with said outlet of said combustor, further comprising a turbine bypass flowpath in parallel fluid communication with said outlet of said combustor with respect to said inlet of said higher pressure turbine; and wherein said higher pressure turbine employs a plurality of shrouded turbine blades, and wherein said turbine bypass flowpath has an inner flowpath wall formed in part by shrouds of said shrouded turbine blades.

21. A variable pressure ratio gas turbine engine, comprising:

a first spool having a first turbine and a first compressor mechanically driven by said first turbine, said first spool having a first pressure ratio;

a second spool having a second turbine and a second compressor mechanically driven by said second turbine, said second spool having a second pressure ratio different from said first pressure ratio;

a combustor; and a flow control system structured to selectively provide flow to said combustor from said first compressor and said second compressor, wherein an inlet of said first compressor is in fluid communication with a discharge of said second compressor, further comprising a compressor bypass flowpath in parallel fluid communication with the discharge of said second compressor with respect to the inlet of said first compressor; and wherein said first compressor employs a plurality of shrouded compressor blades, and wherein said compressor bypass flowpath has an inner flowpath wall formed in part by shrouds of said shrouded compressor blades.

22. A gas turbine engine, comprising:

a higher pressure spool driven by a higher pressure turbine;
a lower pressure spool driven by a lower pressure turbine;
a combustor; and means for selectively fluidly coupling the outlet of said combustor with at least one of said higher pressure turbine and said lower pressure turbine, wherein said means for selectively fluidly coupling is structured to selectively couple an outlet of said combustor to a selected one of an inlet of said higher pressure turbine and an inlet of said lower pressure turbine;

wherein said inlet of said high pressure turbine is in fluid communication with said outlet of said combustor, further comprising a turbine bypass flowpath in parallel fluid communication with said outlet of said combustor with respect to said inlet of said higher pressure turbine;

further comprising two independently variable turbine nozzles, wherein one of the independently variable turbine nozzles is structured to selectively open and close said inlet of said higher pressure turbine and the other of the independently variable turbine nozzles is structured to selectively open and close an inlet of said turbine bypass flowpath, wherein each independently variable turbine nozzle has a turbine vane rotatable about a same axis of rotation as a corresponding turbine vane of the other independently variable turbine nozzle.

23. A gas turbine engine, comprising:

a higher pressure spool driven by a higher pressure turbine;
a lower pressure spool driven by a lower pressure turbine;
a combustor;

means for selectively fluidly coupling the outlet of said combustor with at least one of said higher pressure turbine and said lower pressure turbine, wherein said means for selectively fluidly coupling is structured to selectively couple an outlet of said combustor to a selected one of an inlet of said higher pressure turbine and an inlet of said lower pressure turbine;

two independently variable turbine nozzles, wherein one of the independently variable turbine nozzles is structured to selectively allow and prevent flow from the outlet of said combustor through the one of the independently variable turbine nozzles to said high pressure turbine and the other of the independently variable turbine nozzles is structured to selectively allow and prevent flow from the outlet of said combustor through the other of the independently variable turbine nozzles to said lower pressure turbine, wherein each independently variable turbine nozzle has a turbine vane rotatable about a same axis of rotation as a corresponding turbine vane of the other independently variable turbine nozzle.

\* \* \* \* \*